United States Patent
Nam et al.

(10) Patent No.: US 9,543,587 B2
(45) Date of Patent: Jan. 10, 2017

(54) THIN FILM BATTERY HAVING IMPROVED EFFICIENCY OF COLLECTING ELECTRIC CURRENT

(75) Inventors: Sang Cheol Nam, Seoul (KR); Ho Young Park, Seoul (KR); Ki Chang Lee, Seoul (KR); Gi-Baek Park, Bucheon Si (KR); Dong-Hyuk Cha, Gyeonggi-Do (KR); Joon-Hong Park, Seoul (KR); Young-Woon Kwon, Seoul (KR)

(73) Assignee: Applied Materials, Inc., Santa Clara, CA (US)

( * ) Notice: Subject to any disclaimer, the term of this patent is extended or adjusted under 35 U.S.C. 154(b) by 492 days.

(21) Appl. No.: 12/952,887

(22) Filed: Nov. 23, 2010

(65) Prior Publication Data

US 2011/0123862 A1 May 26, 2011

(30) Foreign Application Priority Data

Nov. 23, 2009 (KR) ........................ 10-2009-0113451

(51) Int. Cl.
| | | |
|---|---|---|
| *H01M 4/00* | (2006.01) | |
| *H01M 4/66* | (2006.01) | |
| *H01M 4/04* | (2006.01) | |
| *H01M 4/134* | (2010.01) | |
| *H01M 4/1395* | (2010.01) | |

(Continued)

(52) U.S. Cl.
CPC .......... *H01M 4/661* (2013.01); *H01M 4/0421* (2013.01); *H01M 4/134* (2013.01); *H01M 4/1395* (2013.01); *H01M 4/667* (2013.01); *H01M 10/0436* (2013.01); *H01M 10/0525* (2013.01); *H01M 10/0562* (2013.01); *H01M 10/0565* (2013.01); *H01M 10/0585* (2013.01); *Y02E 60/122* (2013.01); *Y02P 70/54* (2015.11)

(58) Field of Classification Search
USPC ............................... 430/319; 429/233, 218.1
See application file for complete search history.

(56) References Cited

U.S. PATENT DOCUMENTS 4,992,343 A * 2/1991 Nardi ............................. 429/57
5,561,004 A * 10/1996 Bates et al. .................. 429/162
(Continued)

FOREIGN PATENT DOCUMENTS

| JP | 2000133276 A | 5/2000 |
|---|---|---|
| JP | 2007518246 A | 7/2007 |

(Continued)

OTHER PUBLICATIONS

Japanese Office Action dated Sep. 2, 2014.

*Primary Examiner* — Ula C Ruddock
*Assistant Examiner* — Osei Amponsah
(74) *Attorney, Agent, or Firm* — Pillsbury Winthrop Shaw Pittman LLP (57) ABSTRACT

Provided is a thin film battery, including: a base substrate; a cathode current collector pattern and an anode current collector pattern being formed on the base substrate to be electrically separated from each other; a cathode pattern being formed on the cathode current collector pattern; an electrolyte pattern being formed on the cathode pattern; and an anode pattern being formed on the electrolyte pattern. At least one pattern of the cathode current collector pattern and the anode current collector pattern may include a non-noble metal based alloy.

20 Claims, 8 Drawing Sheets

(51) Int. Cl.
*H01M 10/04* (2006.01)
*H01M 10/0525* (2010.01)
*H01M 10/0562* (2010.01)
*H01M 10/0565* (2010.01)
*H01M 10/0585* (2010.01)

(56) References Cited

U.S. PATENT DOCUMENTS

| | | | | |
|---|---|---|---|---|
| 5,705,293 | A * | 1/1998 | Hobson | 429/162 |
| 6,306,544 | B1 * | 10/2001 | Frysz et al. | 429/233 |
| 6,824,922 | B2 * | 11/2004 | Park et al. | 429/219 |
| 2002/0071989 | A1 * | 6/2002 | Verma et al. | 429/162 |
| 2004/0048157 | A1 * | 3/2004 | Neudecker et al. | 429/231.2 |
| 2005/0147877 | A1 * | 7/2005 | Tarnowski et al. | 429/162 |
| 2006/0121354 | A1 | 6/2006 | Frysz et al. | |
| 2008/0032236 | A1 * | 2/2008 | Wallace et al. | 430/319 |
| 2008/0055279 | A1 * | 3/2008 | Osada et al. | 345/179 |

FOREIGN PATENT DOCUMENTS

| | | | | |
|---|---|---|---|---|
| JP | 2008-171734 | | 7/2008 | |
| JP | 2009509289 A | | 3/2009 | |
| KR | 10-2002-0017790 | * | 3/2002 | H01M 10/36 |
| KR | 2002-0017790 | * | 3/2002 | H01M 10/36 |
| KR | 10-2007-0033397 A | | 3/2007 | |

* cited by examiner

THIN FILM BATTERY HAVING IMPROVED EFFICIENCY OF COLLECTING ELECTRIC CURRENT

CROSS-REFERENCE TO RELATED APPLICATION

This application claims the benefit of Korean Patent Application No. 10-2009-0113451, filed on Nov. 23, 2009, in the Korean Intellectual Property Office, the disclosure of which is incorporated herein by reference.

BACKGROUND

1. Field of the Invention

The present invention relates to a battery field, and more particularly, to a lithium based thin film battery having an excellent manufacturing efficiency and an enhanced battery property.

2. Description of the Related Art

A current collector corresponds to a metal conductor connecting a cathode or an anode of a thin film battery to an external circuit or a load. A material to form the current collector may use a single metal, for example, gold (Au), platinum (Pt), copper (Cu), ruthenium (Ru), chrome (Cr), and the like, or may use a conductive oxide such as indium tin oxide (ITO). In general, a single noble metal such as Pt, Au, and the like may be used for a cathode current collector. Nickel (Ni), molybdenum (Mo), Cu, and the like may be used for an anode current collector.

Pt or Au shows a relatively stable thermal and chemical stability in a crystal growth temperature range of a cathode and thus, may be generally used for the cathode current collector. Cu, Ni, and the like have no reaction with lithium (Li) and thus, may be generally used for the anode current collector. Even though a noble metal such as Pt or Au has a relatively stable thermal and chemical stability in a growth temperature range of a thin film battery, the noble metal is relatively expensive. In addition, a magnetic metal such as Ni has a thickness constraint of a target and a relatively low deposition rate during a deposition process. Accordingly, a replacement cycle may become short, which may result in decreasing an operation rate of a sputtering equipment. Cu may be more easily oxidized in an atmosphere having a high temperature and a relatively large amount of humidity.

When a cathode current collector including a single kind of noble metal is used, a barrier layer may need to be used to prevent a material of a substrate attachment layer from being diffused to a cathode during a heat treatment process. Accordingly, a process efficiency may decrease. In addition, in an economical aspect, the noble metal may have a supply-and-demand issue due to a fluctuation in prices.

SUMMARY

An aspect of the present invention provides a thin film battery having an enhanced battery property and a relatively excellent manufacturing efficiency.

According to an aspect of the present invention, there is provided a thin film battery, comprising: a base substrate; a cathode current collector pattern and an anode current collector pattern being formed on the base substrate to be electrically separated from each other; a cathode pattern being formed on the cathode current collector pattern; an electrolyte pattern being formed on the cathode pattern; and an anode pattern being formed on the electrolyte pattern, wherein at least one pattern of the cathode current collector pattern and the anode current collector pattern may include a non-noble metal based alloy.

The cathode current collector pattern may include a nickel containing alloy. The nickel containing alloy may include 100 parts by weight of nickel and 10 to 60 parts by weight of chrome. In addition, the nickel containing alloy may further include less than or equal to 30 parts by weight of molybdenum, or less than or equal to 40 parts by weight of iron. The anode current collector pattern may include a copper containing alloy, particularly, a zinc containing alloy.

The thin film battery may further include an adhesiveness enhancement layer being disposed between the base substrate and a cathode current collector pattern. After a heat treatment process for crystallization of the cathode pattern in a manufacturing process of the thin film battery, the cathode current collector pattern or the adhesiveness enhancement layer may not be diffused to the cathode pattern.

Since an adhesiveness enhancement layer does not diffuse towards the cathode due to a material characteristic of a current collector, the thin film battery according to the present invention may not include a separate diffusion preventing layer, for example, a barrier layer. However, depending on embodiments, the thin film battery may further include the diffusion preventing layer between the adhesiveness enhancement layer and a cathode current collector pattern.

The base substrate may use a flexible substrate. The flexible substrate may include a polymer substrate, a mica substrate having a thickness of less than or equal to 200 µm, and a silicon substrate and a metal substrate having an insulation processed surface and a thickness of less than or equal to 200 µm.

According to embodiments of the present invention, since a nickel based alloy is used for a cathode current collector pattern, it is possible to reduce a manufacturing cost of a thin film battery, and to prevent impurity substance and the like from being diffused from an underlayer to a cathode without including a diffusion preventing layer. In addition, since a copper based alloy is used for an anode current collector pattern, it is possible to decrease a tact time of the thin film battery and increase shelf life of a cell.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a thin film battery according to an embodiment of the present invention will be described with reference to the accompanying drawings.

Figure 1:
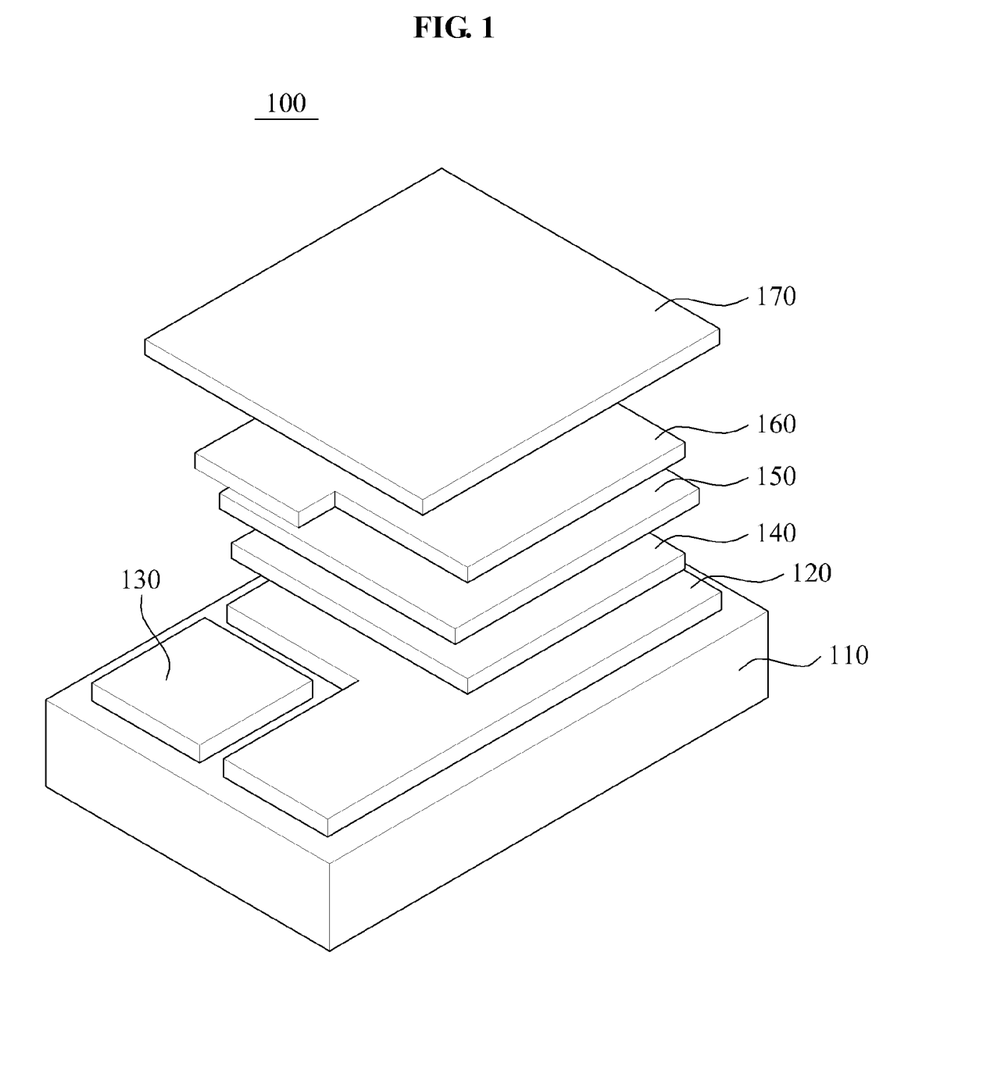
FIG. 1 is a perspective view illustrating a thin film battery according to an embodiment of the present invention.

FIG. 1 is a perspective view illustrating a thin film battery 100 according to an embodiment of the present invention.

Referring to FIG. 1, the thin film battery 100 may include a cathode current collector pattern 120, an anode current collector pattern 130, a cathode pattern 140, an electrolyte pattern 150, and an anode pattern 160 that are disposed on a base substrate 110. The thin film battery 100 may further include a protective layer pattern 170 formed on the base substrate 110. Here, as far as the thin film battery 100 properly operates, an order of disposing constituent elements of the thin film battery 100, a relative location relationship between the constituent elements, each pattern shape, and the like may not be particularly limited.

The base substrate 110 may use one of a metal sheet such as nickel (Ni), titanium (Ti), chrome (Cr), stainless steel, tungsten (W), molybdenum (Mo), and the like; a ceramic or glass substrate such as aluminum oxide ($Al_2O_3$), zirconium oxide ($ZrO_2$), silicon dioxide ($SiO_2$), quartz, glass, mica, and the like; a polymer substrate such as polytetrafluoroethylene, polyimide, polyamide imide, polysulfone, polyphenylene sulfide, polyetherether ketone, polyether ketone, and the like. In particular, when a flexible substrate such as a polymer substrate, a mica substrate having a thickness of less than or equal to 200 μm, and a silicon substrate and a metal substrate having an insulation processed surface and a thickness of less than or equal to 200 μm, and the like is used for the base substrate 100, a deposition condition for sputtering or a material between deposed layers may need to be appropriately adjusted for adhesiveness enhancement. The thin film battery 100 may show a relatively excellent adhesive force between the flexible substrate and the deposited layer by changing a material of current collectors, for example, the cathode current collector pattern 120 and the anode current collector pattern 130.

The cathode current collector pattern 120 may be electrically connected to the cathode pattern 140. The cathode current collector pattern 120 may include a non-noble metal alloy material, for example, a Ni containing alloy, instead of a single material. In the present embodiment, the cathode current collector pattern 120 may include an alloy including 100 parts by weight of Ni and 10 to 60 parts by weight of Cr. In addition to the Ni containing alloy, the cathode current collector pattern 120 may further include less than or equal to 30 parts by weight of Mo, or less than or equal to 40 parts by weight of iron. In the Ni alloy component, a content or a type of a metal component excluding Ni may be determined based on a physical property of the thin film battery 100. The following Table 1 shows types of Ni alloys that may be available for the cathode current collector pattern 120 of the thin film battery 100 and be commercially obtained.

TABLE 1

| Alloy name | Main component | Thermal property | | | | Characteristics |
| --- | --- | --- | --- | --- | --- | --- |
| | | Thermal expansion coefficient (μm/m-° C.) | Heat capacity (J/g-° C.) | Heat conductivity (W/m-K) | Melting point ° C. | |
| Inconel 600 | Ni Balance Cr/15.5, Fe/8, | 13.3 | 0.444 | 14.9 | 1354-1413 | high Ni, high Cr alloy, and excellent corrosion resistance in oxidizing and reducing atmosphere and high temperature |
| Inconel 601 | Ni Balance Cr/23, Fe/14, Al/1.4 | 13.75 | 0.448 | 11.2 | 1360-1411 | having excellent oxidation resistance in high temperature |
| Inconel 617 | Ni Balance Mo/9, Cr/22, Al/1.4, Co/12.5 | 11.6 | 0.419 | 13.6 | 1330-1380 | having excellent oxidation resistance in high temperature |
| Inconel 625 | Ni Balance Cr/21.5, Mo/9, Nb + Ta/3.5 | 12.8 | 0.41 | 9.8 | 1290-1360 | alloy having high strength from very low temperature up to high temperature of 980° C., and having excellent corrosion resistance with oxidation resistance and fatigue strength |
| Inconel 690 | Ni Balance Cr/30, Fe/9.5 | 15.19 | 0.45 | 13.5 | 1343-1377 | having excellent corrosion resistance against gas containing oxidizing chemicals and sulfur |
| Inconel 718 | Ni Balance Mo/3, Cr/19, Fe/18.5, Nb + Ta/5.1 | 13.0 | 0.435 | 11.4 | 1260-1336 | age hardening alloy showing excellent strength from low temperature of −250° C. up to high temperature of 700° C., possible welding in aged state, and having excellent oxidation resistance up to 980° C. |
| Inconel x-750 | Ni Balance Ti/2.5, Cr/15.5, Al/0.7, Fe/7, Nb + Ta/1.0 | 12.6 | 0.431 | 12 | 1390-1430 | age hardening alloy having excellent corrosion resistance and oxidation resistance |
| Inconel C-2000 | Ni Balance Cr/23, Cu/1.6, Mo/16 | 12.6 | — | 9.1 | — | having corrosion resistance in oxidizing atmosphere of nitric acid, chlorine, etc. |
| Inconel C-276 | Ni Balance Cr/15, Fe/6, Mo/16, Ta/4 | 12 | 0.427 | 7.2 | 1323-1371 | |
| Inconel C-22 | Ni Balance Cr/22, Fe/3, Mo/13, w/3 | 12.4 | 0.414 | 10.1 | 1357-1399 | |

The aforementioned alloys constituting the cathode current collector pattern 120 may have a heat resistance characteristic and an oxidation resistance characteristic, and may form the cathode current collector pattern 120 without a transformation of a layer by oxidation or a decrease in a conductivity when a heat treatment is performed in a high temperature during a deposition process.

In the present embodiment, to secure the adhesiveness with the surface of the base substrate 100, the cathode current collector pattern 120 may be formed by performing direct current (DC) sputtering of an adhesiveness enhancement layer with a thickness of 100 to 450 nm and at a power density of 2 to 6 W/cm$^2$ in an argon (Ar) plasma atmosphere of 0.2 to 1.6 Pa, and by consecutively performing DC sputtering of a heat resistant and oxidation resistant non-noble metal alloy, having an excellent conductivity and oxidation resistance in a vacuum atmosphere, with a thickness of 30 to 200 nm and at a power density of 2 to 6 W/cm$^2$ in an Ar plasma atmosphere of 0.2 to 1.6 Pa.

The anode current collector pattern 130 may be electrically connected to the anode pattern 160, and be electrically separated from the cathode current collector pattern 120. The anode current collector pattern 130 may be formed of a material having a relatively high conductivity while not causing a chemical change in the thin film battery 100. In the present embodiment, the anode current collector pattern 130 may include a Cu based alloy. The Cu based alloy may include zinc.

An embodiment where both the cathode current collector pattern 120 and the anode current collector pattern 130 include a non-noble metal alloy is described above. However, it is only an example and thus, the present invention may also be applicable to a case where only one of the cathode current collector pattern 120 and the anode current collector pattern 130 selects the non-noble metal alloy.

Deposition of the cathode current collector pattern 120 and the anode current collector pattern 130 may be performed by applying a thin film deposition device and technology used for a semiconductor process. The thin film deposition device and technology may include a magnetron radio frequency (RF) sputter, a magnetron DC sputter, an electronic beam (e-beam) evaporator, a thermal evaporator, a chemical vapor deposition (CVD), a pulsed laser deposition (PLD), a Sol-gel process, and the like. In the present embodiment, a magnetron sputtering device capable of providing a relatively high efficiency and process facilitation may be used for deposition of the cathode current collector pattern 120 and the anode current collector pattern 130.

Figure 2:
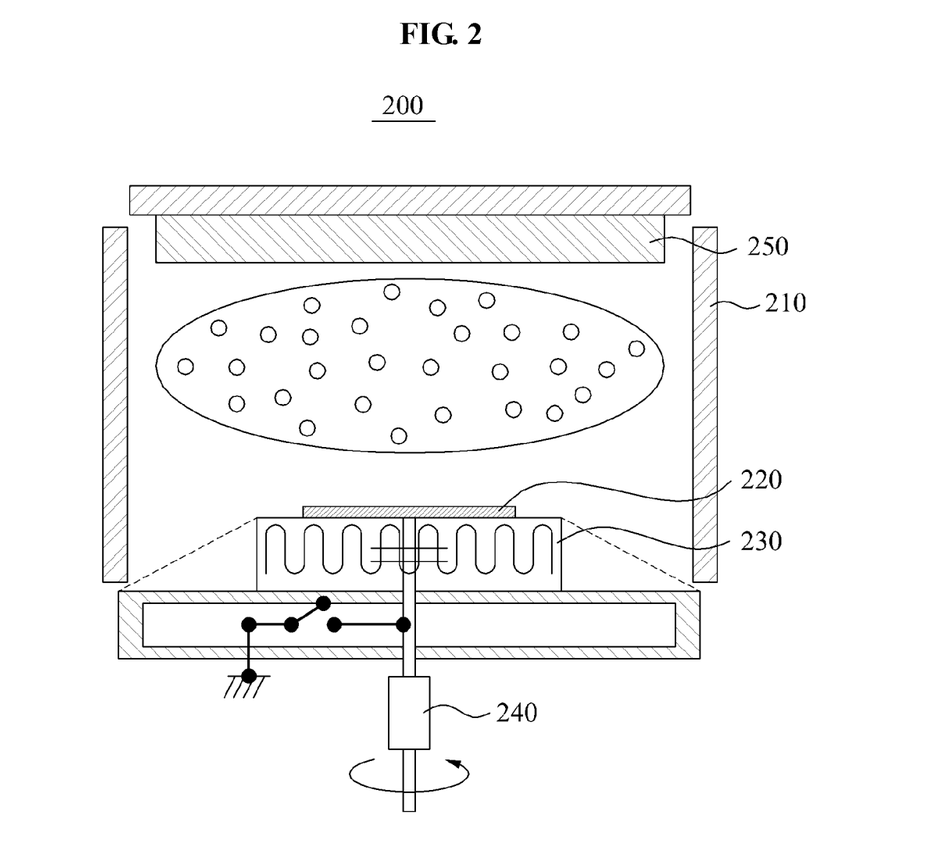
FIG. 2 is a cross-sectional view illustrating a magnetron sputtering device usable during a manufacturing process according to an embodiment of the present invention.

FIG. 2 is a cross-sectional view illustrating a magnetron sputtering device 200 applicable during a manufacturing process according to an embodiment of the present invention.

Referring to FIG. 2, the magnetron sputtering device 200 may include a reaction chamber 210, a stage 220, a heater 230 being mounted below the stage 220, and a rotation motor 240 to rotate the stage 220 on a rotation axis. A target 250 may be disposed in an upper portion of the chamber 210.

An active material may be used for the cathode pattern 140. For example, an cathode pattern active material may use, as a compound capable of variably intercalating/de-intercalating lithium in a lithium battery, one of or a combination of at least two of lithium cobalt oxide (LiCoO$_2$), lithium manganese oxide (LiMn$_2$O$_4$), lithium nickel oxide (LiNiO$_2$), lithium iron phosphate (LiFePO$_4$), lithium nickel vanadium oxide (LiNiVO$_4$), lithium cobalt manganese peroxide (LiCoMnO$_4$), lithium cobalt nickel manganese oxide (LiCO$_{1/3}$Ni$_{1/3}$Mn$_{1/3}$O$_2$), vanadium oxide (V$_2$O$_5$), manganese dioxide (MnO$_2$), molybdic acid (MoO$_3$), and the like.

Referring again to FIG. 1, the electrolyte pattern 150 is disposed between the cathode pattern 140 and the anode pattern 160, and may use a non-organic solid electrolyte or an organic solid electrolyte. For example, the non-organic solid electrolyte may be a ceramic based material, Li$_2$O—B$_2$O$_3$, Li$_2$O—V$_2$O$_5$—SiO$_2$, Li$_2$SO$_4$—Li$_2$O—B$_2$O$_3$, Li$_3$PO$_4$, Li$_2$O—Li$_2$WO$_4$—B$_2$O$_3$, LiPON, LiBON, and the like, and may use one of or a combination of at least two thereof. For example, the organic solid electrolyte may include a mixture of lithium with a polyethylene derivative, a polyethylene oxide derivative, a polypropylene oxide derivative, a phosphoric acid ester polymer, poly agitation lysine, polyester sulfide, polyvinyl alcohol, poly fluoride vinylidene, and the like, and may also use one of or a combination of at least two thereof.

An active material may also be used for the anode pattern 160. For example, a anode pattern active material may also use, as a compound capable of variably intercalating/de-intercalating lithium in a lithium battery, one of or a combination of at least two of Li, Sn$_3$N$_4$, Si, graphite, Li based alloy, and the like.

The protective layer pattern 170 is to prevent the thin film battery 100 from being oxidized in the air, and may include an organic protective layer pattern, or a non-organic protective layer pattern, or a combination of the organic protective layer pattern and the non-organic protective layer pattern.

Figure 3:
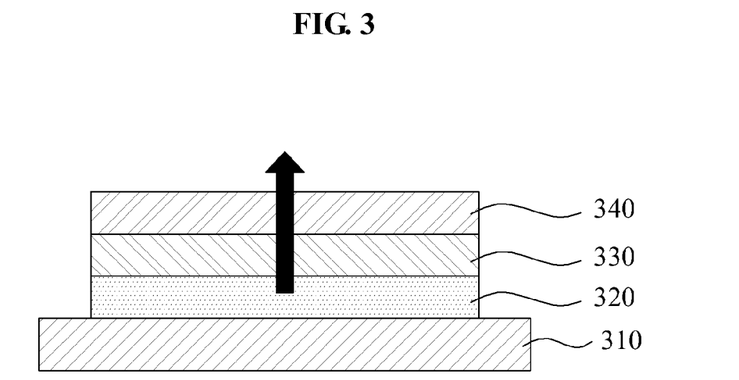
FIG. 3 is a cross-sectional view illustrating a bonding structure of a cathode current collector according to an embodiment of the present invention.
Figure 4:
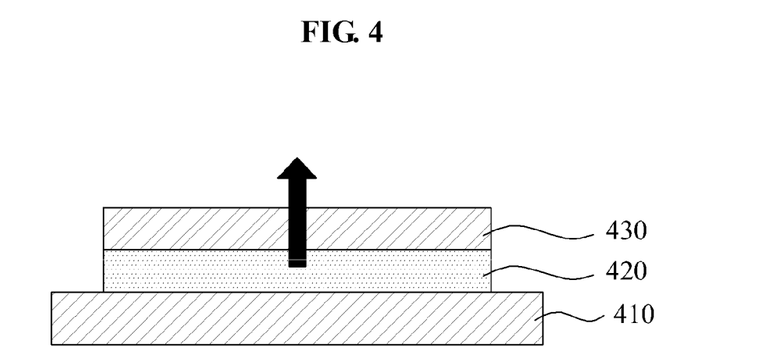
FIG. 4 is a cross-sectional view illustrating a bonding structure of a cathode current collector according to another embodiment of the present invention.

FIG. 3 is a cross-sectional view illustrating a bonding structure of a cathode current collector 340 according to an embodiment of the present invention, and FIG. 4 is a cross-sectional view illustrating a bonding structure of a cathode current collector 430 according to another embodiment of the present invention.

Referring to FIG. 3, an adhesiveness enhancement layer 320 and a diffusion preventing layer 330 are sequentially disposed between a base substrate 310 and the cathode current collector 340. The diffusion preventing layer 330 functions to prevent impurity substance and the like from being diffused from the adhesiveness enhancement layer 320. However, the cathode current collector 340 may be formed of a Ni alloy and thus, may effectively prevent diffusion of the adhesiveness enhancement layer 320 without separately including the diffusion preventing layer 330.

FIG. 4 shows a bonding structure of the cathode current collector 430 without including a diffusion preventing layer. Referring FIG. 4, the cathode current collector 430 is directly attached to an adhesiveness enhancement layer 420 without inserting the diffusion preventing layer between a base substrate 410 and the cathode current collector 430.

For example, a material of the adhesiveness enhancement layer 320 or 420, and the diffusion preventing layer 330 may be oxide and the like such as a metal or a ceramic having a relatively excellent thermal stability, particularly, titanium (Ti), thallium (Ta), titanium nitride (TiN), titanium oxide (TiO$_2$), alumina (Al$_2$O$_3$), magnesium oxide (MgO), and the like.

Diffusion Test

Figure 5A:
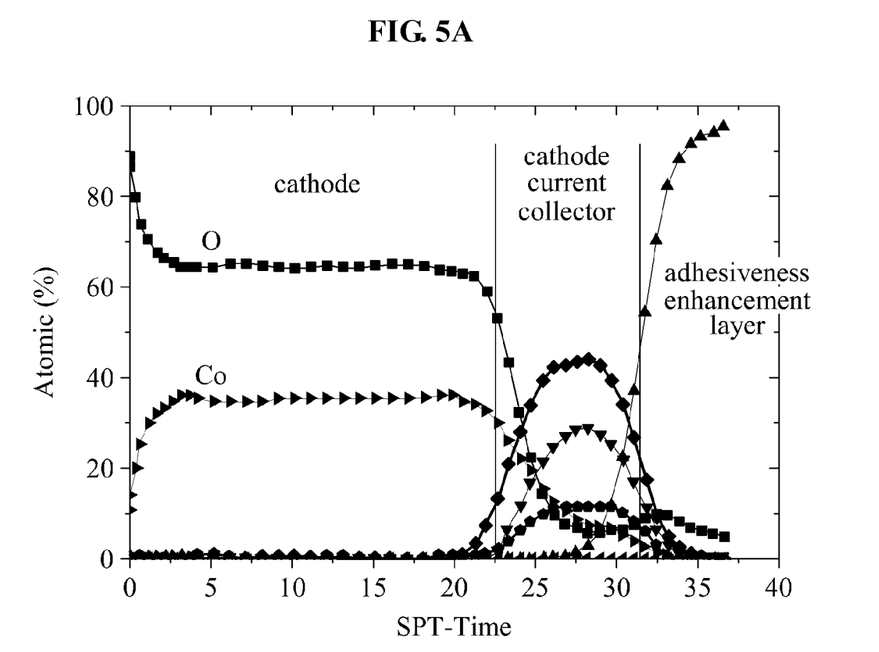
FIGS. 5A and 5B are auger electron spectroscopy (AES) graphs showing a test result regarding whether a cathode current collector or an adhesiveness enhancement layer is diffused to a cathode after a heat treatment in a high temperature when the cathode current collector including a non-noble metal alloy is employed according to an embodiment of the present invention.
Figure 5B:
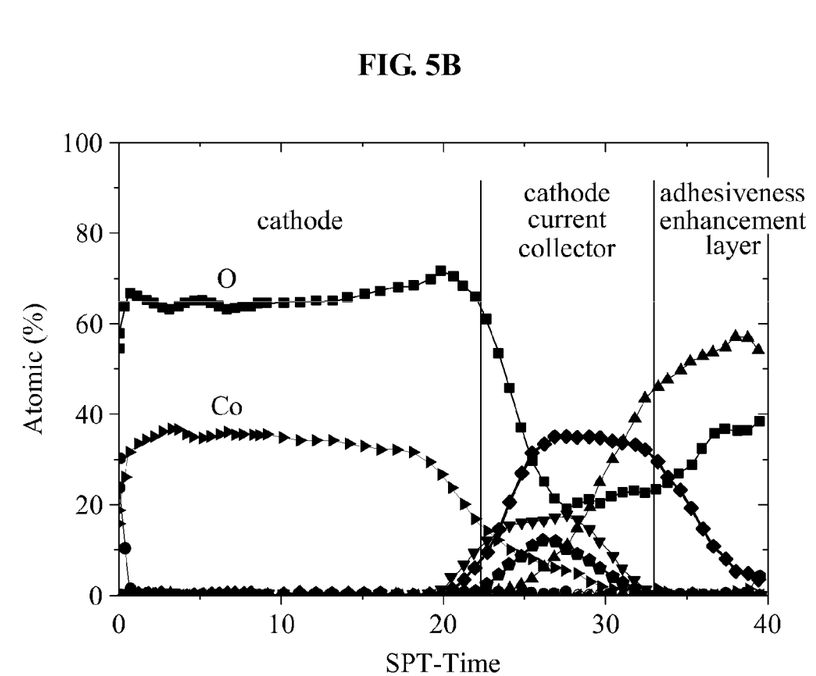

FIGS. 5A and 5B are auger electron spectroscopy (AES) graphs showing a test result regarding whether a cathode current collector or an adhesiveness enhancement layer is diffused to a cathode after a heat treatment in a high temperature when the cathode current collector including a non-noble metal alloy is employed according to an embodiment of the present invention.

Comparing FIG. 5A corresponding to a before heat treatment with FIG. 5B corresponding to an after heat treatment, it can be seen that the cathode current collector and the adhesiveness enhancement layer were not diffused to the cathode.

Comparison of Sputter Yield of Anode Material

Figure 6A:
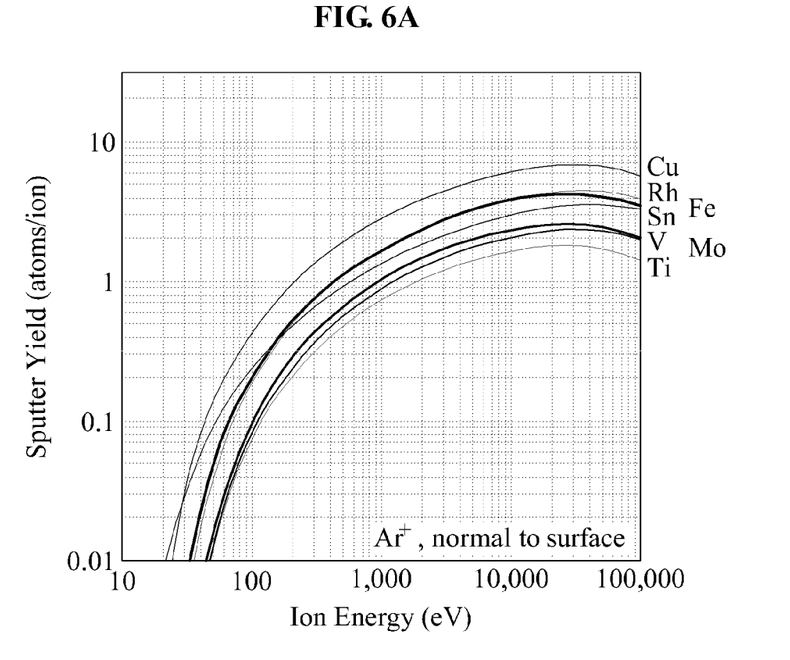
FIGS. 6A and 6B are graphs showing a sputter yield based on various metal materials according to an embodiment of the present invention.
Figure 6B:
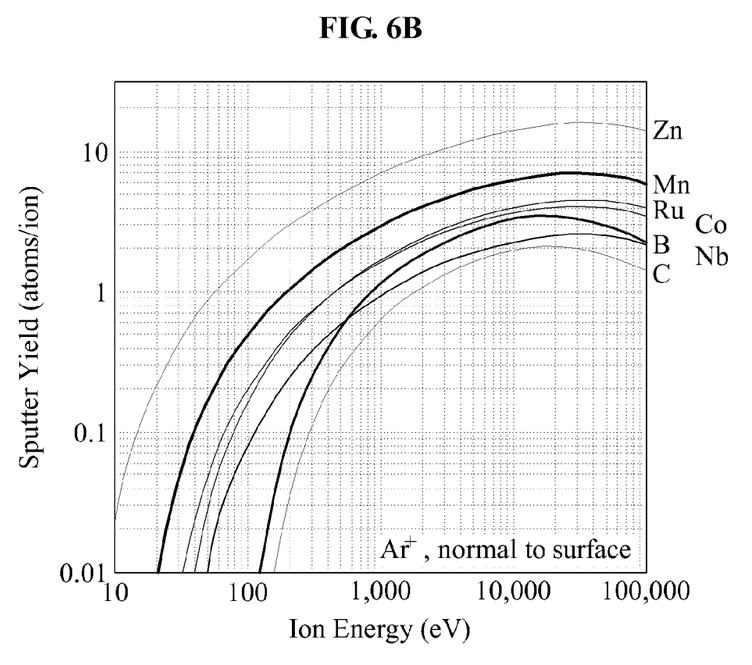

FIGS. 6A and 6B are graphs showing a sputter yield based on various metal materials according to an embodiment of the present invention. Each of materials was deposed using DC sputtering with a thickness of 200 to 500 nm and at a power density of 2 to 5 W/cm$^2$ in an Ar plasma atmosphere of 0.6 to 1.0 Pa.

It can be seen from FIG. 6A that the sputter yield of Cu was highest, and it can be seen from FIG. 6B that the sputter yield of Zn was highest. Accordingly, it is desirable to use a Zn containing material or a Cu containing material for the anode current collector.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A thin film battery, comprising:
   a base substrate;
   a cathode current collector pattern and an anode current collector pattern being formed on the base substrate to be electrically separated from each other, wherein the cathode current collector pattern does not overlap the anode current collector pattern in a thickness direction of the substrate;
   a cathode pattern being formed on the cathode current collector pattern;
   an electrolyte pattern being formed on the cathode pattern, wherein the electrolyte pattern does not overlap the anode current collector pattern in the thickness direction of the substrate, wherein the cathode pattern is not fully covered the electrolyte pattern, and wherein the cathode current collector pattern does not contact with the electrolyte pattern; and
   an anode pattern being formed on the electrolyte pattern, wherein at least one pattern of the cathode current collector pattern or the anode current collector pattern comprises a non-noble metal based alloy,
   wherein the cathode current collector pattern comprises two sides each of which faces with a side of the anode current collector pattern,
   wherein the anode pattern comprises a protrusion portion, and
   wherein top surfaces of both the cathode current collector and the anode current collector are on the same plane.

2. The thin film battery of claim 1, wherein the cathode current collector pattern comprises a nickel containing alloy.

3. The thin film battery of claim 2, wherein the nickel containing alloy comprises 100 parts by weight of nickel and 10 to 60 parts by weight of chrome.

4. The thin film battery of claim 3, wherein the nickel containing alloy further comprises less than or equal to 30 parts by weight of molybdenum.

5. The thin film battery of claim 3, wherein the nickel containing alloy further comprises less than or equal to 40 parts by weight of iron.

6. The thin film battery of claim 1, wherein the anode current collector pattern comprises a copper containing alloy.

7. The thin film battery of claim 6, wherein the copper containing alloy comprises zinc.

8. The thin film battery of claim 1, further comprising:
   an adhesiveness enhancement layer being disposed between the base substrate and a cathode current collector pattern.

9. The thin film battery of claim 8, wherein after a heat treatment process for crystallization of the cathode pattern in a manufacturing process of the thin film battery, the cathode current collector pattern or the adhesiveness enhancement layer is not diffused to the cathode pattern.

10. The thin film battery of claim 8, further comprising:
    a diffusion preventing layer being disposed between the adhesiveness enhancement layer and the cathode current collector pattern.

11. The thin film substrate of claim 1, wherein the base substrate corresponds to a flexible substrate.

12. The thin film battery of claim 11, wherein the base substrate corresponds to one of a polymer substrate, a mica substrate having a thickness of less than or equal to 200 μm, and a silicon substrate and a metal substrate having an insulation processed surface and a thickness of less than or equal to 200 μm.

13. The thin film battery of claim 1, wherein
    the cathode pattern is electrically connect with the cathode current collector pattern, and
    the anode pattern having a projection extending beyond the electrolyte pattern, the projection overlapping the anode current collector pattern in the thickness direction of the substrate and configured to electrically connect with the anode current collector pattern.

14. The thin film battery of claim 13, wherein the cathode current collector pattern surrounds the anode current collector pattern on at least two sides of the anode current collector pattern.

15. A thin film battery, comprising:
    a base substrate;
    a cathode current collector pattern on the base substrate;
    an anode current collector pattern on the base substrate electrically separated from the cathode current collector pattern;
    a cathode pattern on the cathode current collector pattern;
    an electrolyte pattern on the cathode pattern, wherein the electrolyte pattern does not overlap the anode current collector pattern in a thickness direction of the substrate, wherein the cathode pattern is not fully covered the electrolyte pattern, and wherein the cathode current collector pattern does not contact with the electrolyte pattern; and
    an anode pattern on the electrolyte pattern, wherein the anode pattern having a projection extending beyond the electrolyte pattern, the projection configured to electrically connect with the anode current collector pattern,
    wherein at least one pattern of the cathode current collector pattern or the anode current collector pattern comprises a non-noble metal based alloy,
    wherein the cathode current collector pattern does not overlap the anode current collector pattern in the thickness direction of the substrate,
    wherein the cathode current collector pattern comprises two sides each of which faces with a side of the anode current collector pattern,
    wherein the anode pattern comprises a protrusion portion, and
    wherein top surfaces of both the cathode current collector and the anode current collector are on the same plan.

16. The thin film battery of claim 15, wherein cathode current collector comprises a nickel containing alloy comprises 100 parts by weight of nickel, 10 to 60 parts by weight of chrome, less than or equal to 30 parts by weight of molybdenum, and less than or equal to 40 parts by weight of iron.

17. A thin film battery, comprising:
a base substrate;
a cathode current collector pattern on the base substrate;
an anode current collector pattern on the base substrate electrically separated from the cathode current collector pattern, wherein the cathode current collector pattern surrounds the anode current collector pattern on at least two sides of the anode current collector pattern;
a cathode pattern on the cathode current collector pattern;
an electrolyte pattern on the cathode pattern, wherein the electrolyte pattern does not overlap the anode current collector pattern in the thickness direction of the substrate, wherein the cathode pattern is not fully covered the electrolyte pattern, and wherein the cathode current collector pattern does not contact with the electrolyte pattern; and
an anode pattern on the electrolyte pattern,
wherein at least one pattern of the cathode current collector pattern or the anode current collector pattern comprises a non-noble metal based alloy, wherein the cathode current collector pattern does not overlap the anode current collector pattern in a thickness direction of the substrate,
wherein the cathode current collector pattern comprises two sides each of which faces with a side of the anode current collector pattern,
wherein the anode pattern comprises a protrusion portion, and
wherein top surfaces of both the cathode current collector and the anode current collector are on the same plan.

18. The thin film battery of claim 17, wherein cathode current collector comprises a nickel containing alloy comprises 100 parts by weight of nickel, 10 to 60 parts by weight of chrome, less than or equal to 30 parts by weight of molybdenum, and less than or equal to 40 parts by weight of iron.

19. The thin film substrate of claim 14, wherein an entirety of the electrolyte pattern is above an entirety of the cathode pattern.

20. The thin film substrate of claim 17, wherein an entirety of the electrolyte pattern is above an entirety of the cathode pattern.

* * * * *

UNITED STATES PATENT AND TRADEMARK OFFICE
CERTIFICATE OF CORRECTION

PATENT NO. : 9,543,587 B2
APPLICATION NO. : 12/952887
DATED : January 10, 2017
INVENTOR(S) : Sang Cheol Nam et al.

Page 1 of 1

It is certified that error appears in the above-identified patent and that said Letters Patent is hereby corrected as shown below:

In the Claims

Claim 15, Column 8, Line 67 replace "plan" with --plane--.

Claim 17, Column 10, Line 12 replace "plan" with --plane--.

Signed and Sealed this
Twenty-third Day of May, 2017

Michelle K. Lee
*Director of the United States Patent and Trademark Office*